United States Patent
Chawla et al.

(10) Patent No.: US 11,900,240 B2
(45) Date of Patent: Feb. 13, 2024

(54) VARIABLE CLOCK ADAPTATION IN NEURAL NETWORK PROCESSORS

(71) Applicants: STMICROELECTRONICS S.r.l., Agrate Brianza (IT); STMicroelectronics International N.V., Geneva (CH)

(72) Inventors: Nitin Chawla, Noida (IN); Giuseppe Desoli, San Fermo Della Battaglia (IT); Manuj Ayodhyawasi, Noida (IN); Thomas Boesch, Rovio (CH); Surinder Pal Singh, Noida (IN)

(73) Assignees: STMICROELECTRONICS S.r.l., Agrate Brianza (IT); STMicroelectronics International N.V., Geneva (CH)

( * ) Notice: Subject to any disclaimer, the term of this patent is extended or adjusted under 35 U.S.C. 154(b) by 820 days.

(21) Appl. No.: 17/023,144

(22) Filed: Sep. 16, 2020

(65) Prior Publication Data

US 2021/0081773 A1 Mar. 18, 2021

Related U.S. Application Data

(60) Provisional application No. 62/902,294, filed on Sep. 18, 2019.

(51) Int. Cl.
*G06N 3/06* (2006.01)
*G06F 1/32* (2019.01)
(Continued)

(52) U.S. Cl.
CPC ............ *G06N 3/063* (2013.01); *G06F 1/08* (2013.01); *G06F 1/324* (2013.01); *G06F 1/3228* (2013.01);
(Continued)

(58) Field of Classification Search
CPC ......... G06N 3/063; G06F 1/08; G06F 1/3228; G06F 1/324; G06F 1/3296; G06F 9/5027
See application file for complete search history.

(56) References Cited

U.S. PATENT DOCUMENTS 7,061,292 B2   6/2006   Maksimovic et al.
7,113,835 B2   9/2006   Boyden et al.
(Continued)

FOREIGN PATENT DOCUMENTS

| CN | 109491494 A | 3/2019 |
| DE | 101 97 407 B4 | 6/2017 |
| KR | 10-2019-0104406 A | 9/2019 |

OTHER PUBLICATIONS

Pourshaghaghi, et al., "Dynamic Voltage Scaling Based on Supply Current Tracking Using Fuzzy Logic Controller", *2009 16th IEEE International Conference on Electronics, Circuits and Systems*, 2009, pp. 779-782.

*Primary Examiner* — Stefan Stoynov
(74) *Attorney, Agent, or Firm* — Seed IP Law Group LLP

(57) ABSTRACT

Systems and devices are provided to increase computational and/or power efficiency for one or more neural networks via a computationally driven closed-loop dynamic clock control. A clock frequency control word is generated based on information indicative of a current frame execution rate of a processing task of the neural network and a reference clock signal. A clock generator generates the clock signal of neural network based on the clock frequency control word. A reference frequency may be used to generate the clock frequency control word, and the reference frequency may be based on information indicative of a sparsity of data of a training frame.

23 Claims, 5 Drawing Sheets

(51) Int. Cl.
*G06F 9/50* (2006.01)
*G06F 1/08* (2006.01)
*G06N 3/063* (2023.01)
*G06N 3/082* (2023.01)
*G06F 1/3228* (2019.01)
*G06F 1/324* (2019.01)
*G06F 1/3296* (2019.01)

(52) U.S. Cl.
CPC .......... *G06F 1/3296* (2013.01); *G06F 9/5027* (2013.01); *G06N 3/082* (2013.01)

(56) References Cited

U.S. PATENT DOCUMENTS

| | | | |
|---|---|---|---|
| 11,347,916 B1* | 5/2022 | Desai | G06N 3/063 |
| 2009/0161809 A1 | 6/2009 | Xiu et al. | |
| 2016/0027480 A1* | 1/2016 | Jiang | G06F 1/26 |
| | | | 713/300 |
| 2020/0201412 A1* | 6/2020 | Felix | G06F 1/324 |
| 2020/0250539 A1 | 8/2020 | Liu et al. | |

* cited by examiner

VARIABLE CLOCK ADAPTATION IN NEURAL NETWORK PROCESSORS

BACKGROUND

Technical Field

The present disclosure generally relates to power and computational efficiency of neural networks more particularly, but not exclusively, the present disclosure relates to control of a neural network clock.

Description of the Related Art

Various efforts have been employed to increase the computational and/or power efficiency of various types of neural networks, including recursive neural networks (RNNs), deep neural networks (DNNs), convolutional neural networks (CNNs), Long Short-Term Memory (LSTM) neural networks, and others. Such efficiencies may be of particular importance for such neural networks when implemented via mobile devices. Typically, computational efficiency may be evaluated in terms of Tera Operations Per Second (TOPS), a common performance metric used for high-performance neural network systems. TOPS per watt (TOPS/W) extends that measurement to describe performance efficiency. In general, the higher the TOPS/W associated with a neural network System on Chip (SOC), the more efficient the SOC.

BRIEF SUMMARY

In an embodiment, a device comprises control word generation circuitry, which, in operation, generates a clock frequency control word based on information indicative of a current frame execution rate of a processing task of a neural network and a reference clock signal. A clock generator coupled to the control word generation circuitry generates a neural network clock signal for use by the neural network based on the clock frequency control word.

In an embodiment, a system comprises neural network accelerator circuitry and closed-loop clock-rate control circuitry coupled to the neural network accelerator circuitry. The closed-loop clock-rate control circuitry generates a clock signal of the neural network accelerator circuitry, and includes control-word generation circuitry, which, in operation, generates a clock frequency control word based on information indicative of a current frame execution rate of a processing task of the neural network accelerator circuitry and a reference clock signal, and a clock generator coupled to the control word generation circuitry. The clock generator generates the clock signal of neural network accelerator circuitry based on the clock frequency control word.

In an embodiment, a method comprises executing a kernel using a neural network accelerator and performing closed-loop clock-rate control of an operating frequency of the neural network accelerator during execution of the kernel. The closed-loop clock-rate control includes generating a clock frequency control word based on information indicative of a current frame execution rate of the kernel and a reference clock signal, and generating a clock signal of neural network accelerator circuitry based on the clock frequency control word. In an embodiment, a non-transitory computer-readable medium's contents configure a neural network accelerator system of perform one or more of the methods disclosed herein.

DETAILED DESCRIPTION

Figure 1:
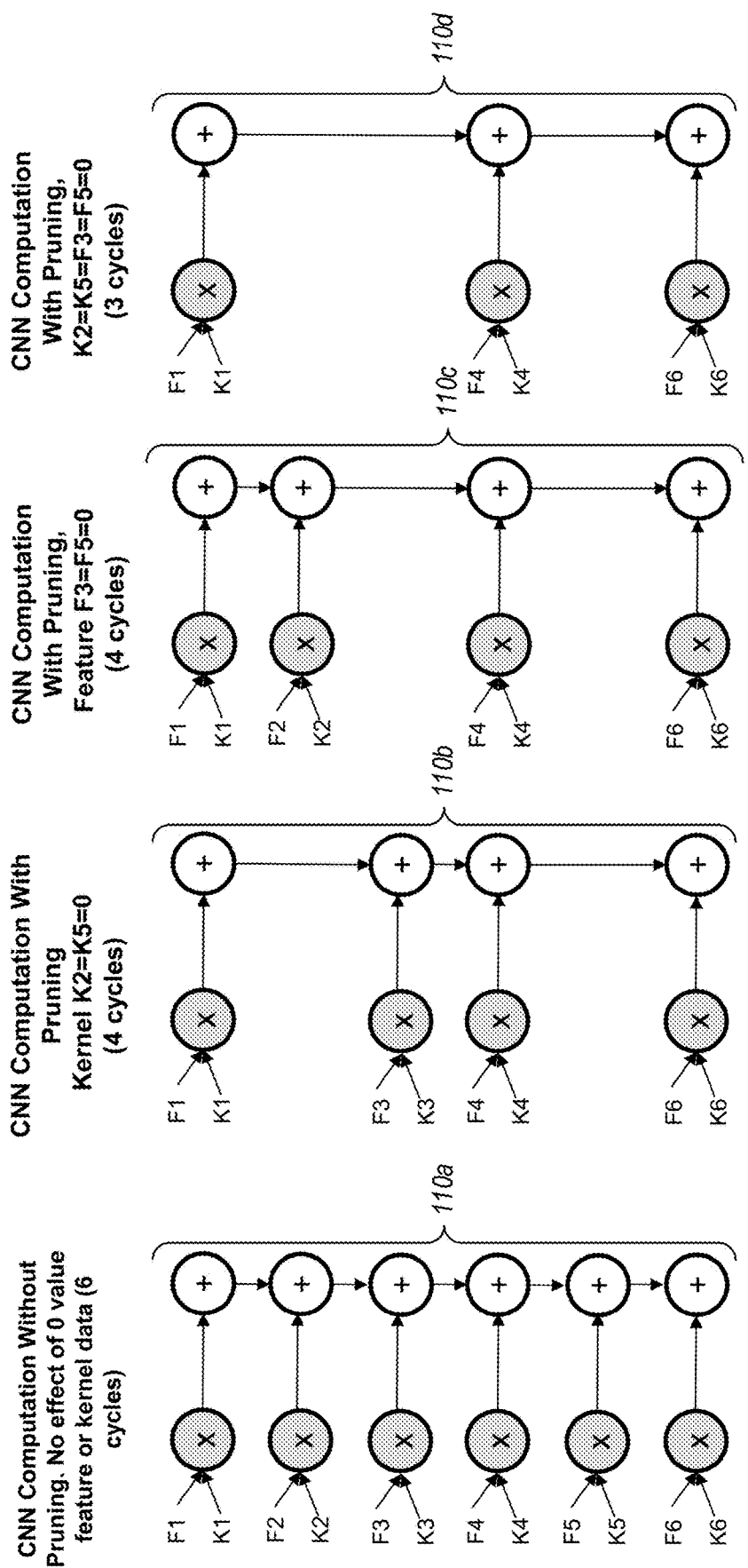
FIGS. 1A-1D graphically depict a convolutional process performed by an exemplary convolutional neural network (CNN) utilizing various degrees of neural network pruning.

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, circuits, such as transistors, integrated circuits, logic gates, memories, interfaces, bus systems, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to." Reference to "at least one of" shall be construed to mean either or both the disjunctive and the inclusive, unless the context indicates otherwise.

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

Typical solutions for increasing power efficiency of a neural network have involved static adaptive voltage scaling (AVS), in which voltage supplied to one or more processors of the neural network is modified based on one or more static lookup tables regarding a current computational load on the one or more processors; dynamic AVS, in which closed-loop control of on-chip processing and/or variation monitoring is generally performed based on an output of one or more sensors; adaptive body bias (ABB), such as may be utilized in silicon processes that have a Fully Depleted Silicon on Insulator (FDSOI) substrate; and dynamic voltage frequency scaling (DVFS), which generally utilizes lookup tables in order to scale an operating frequency of the neural network hardware as a function of voltage when a predicted load on one or more processors of the neural network is low.

Neural networks (including as non-limiting examples recursive neural networks, deep neural networks, convolutional neural networks, LSTM neural networks, etc.) may utilize network pruning to reduce a computational load on the neural network (NN) itself, as well as on any coupled neural network accelerator subsystem. In at least certain implementations of such pruning, after a neural network is trained, it is then fine-tuned to determine the importance of specific connections within the neural network. Generally, pruning effectively compresses a trained neural network by iteratively removing particular connections or nodes determined to have lesser importance. In certain implementations, weighted information determined to have less relative importance may be also removed, such as based on secondary and/or derivative data.

Depending on the specific implementation, pruning may result in significantly reducing a quantity of connections or nodes in a neural network, along with corresponding reductions in power requirements, while largely maintaining the accuracy of produced results. Neural network pruning may also result in a relative sparsity of data, which may allow the neural network (and/or an associated neural network accelerator subsystem) to run at lower clock speeds while still handling the computational load. In particular, neural network size reduction/compression techniques (e.g., pruning, quantization, and range segmenting based on kernel weights or activation volumes) may lead to additional sparsity of data in neural network processing.

Techniques herein are generally directed to a computationally driven dynamic clock control that utilizes information, which may be indicative of data sparsity, in closed-loop control of a phase lock loop (PLL) or frequency lock loop (FLL) clock generator coupled to, for example, a neural network accelerator subsystem. In certain embodiments, such a computational clock may improve energy efficiency (such as measured in TOPS/W or other suitable manner) for neural network or other processing, such as relative to a switched single-frequency clock. In at least some embodiments, the techniques described herein are compatible with down spread frequency modulation, such as down spread spectrum modulation which modulates below a nominal clock frequency. Moreover, techniques described herein, such as modulation of system operating frequency based on data sparsity, may in certain embodiments provide results similar to some down spread modulation schemes, such as by operating to prevent a desired maximum operating frequency of the system from being exceeded. Moreover, such techniques may facilitate avoiding large-activity power perturbation and consequent settling ripple within a coupled power distribution system. For example, by gradually modulating a power supply through a low bandwidth control loop that may follow an average frequency transition based on an average of data sparsity during execution. Such techniques may compare favorably, for example, to schemes involving clock gating and/or power gating in order to avoid such power perturbation and consequent settling ripple.

In various embodiments, such techniques may be utilized independently of particular neural network accelerator architecture and limitations, and may be used for single neural network, neural network series, and/or parallel operation of multiple neural networks, and with other systems, such as other processing accelerators (e.g., Gated Recurrent Units or "GRU" accelerators, LSTM accelerators, etc.), encoders, decoders, etc. Notably, such variable clock adaptation based, for example, on dynamic changes in data sparsity may be utilized separately or in conjunction with additional solutions for increasing neural network efficiency, including (as non-limiting examples) the AVS, ABB, and DVFS types of solutions noted above.

FIGS. 1A-1D graphically depict a convolutional process performed by an exemplary convolutional neural network (CNN) with various degrees of pruning, such as to illustrate the corresponding data sparsity resulting from such pruning. In the depicted embodiment, the exemplary CNN system 201 (see FIG. 2) is intended for use in image frame recognition (such as video frame recognition and/or still frame recognition provided to the CNN system), it will be appreciated that other embodiments of the techniques described herein may be utilized for any other purpose suitable for implementation via one or more neural networks.

FIG. 1A depicts a series of six kernels K1-K6 respectively applied to six respective image features F1-F6 during the course of image frame recognition. Notably, computation of the CNN here occurs without pruning, such that there is no pruning effect of a zero-value feature or kernel data. Thus, regardless of the values present in the individual kernels or features, each of the six respective convolutional applications requires a computation cycle to complete, as depicted via the six computation cycles 110*a*.

FIG. 1B depicts the same series of six kernels K1-K6 respectively applied to the six respective image features F1-F6. However, here kernels K2 and K5 of the CNN have each been value-weighted as zero, pruning the exemplary CNN in a manner that effectively removes from processing the application of those pruned kernels K2 and K5 to the corresponding image features F2 and F5. Therefore, only four computation cycles 110*b* are needed to process the individual frame.

FIG. 1C again depicts the same series of six kernels K1-K6 respectively applied to the six respective image features F1-F6. Here, in the depicted arrangement features F3 and F5 of the CNN have each been value-weighted as zero, pruning the exemplary CNN in a manner that effectively removes from processing the application of the corresponding kernels K3 and K5 to those pruned features F3 and F5. As a result, only four computation cycles 110*c* are needed to process the individual frame.

FIG. 1D once again depicts the same series of six kernels K1-K6 respectively applied to the six respective image features F1-F6. Here, each of features F3 and F5 and each of kernels K2 and K5 of the CNN have been respectively value-weighted as zero, pruning the exemplary CNN in a manner that removes from processing the application of the corresponding kernels K3 and K5 to the pruned image features F3 and F5, as well as the application of pruned kernel K2 to image feature F2. As a result, only the applications of kernel K1 to image feature F1, of kernel K4 to image feature F4, and kernel K6 to image feature F6 are performed, indicating that only three computation cycles 110*c* are needed to process the individual frame.

As seen from the examples of FIGS. 1A-1D, pruning of a neural network may both increase the sparsity of resulting data and decrease the processing resources associated with an individual image frame analyzed by the neural network, such that different output feature map data consumes a disparate quantity of processing cycles. Thus, in at least some embodiments of techniques described herein, an indication of start-interrupts and stop-interrupts associated with an individual processing frame may allow for real-time measurement of processing cycles and frame execution time, as well as to serve as an indication of data sparsity of the neural network. It will be appreciated that while the pruning illustrated in FIGS. 1A-1D generally describes single cluster processing, similar pruning during parallel cluster processing may result in similar data sparsity and be reflected in a corresponding reduction of frame processing cycles.

Figure 2:
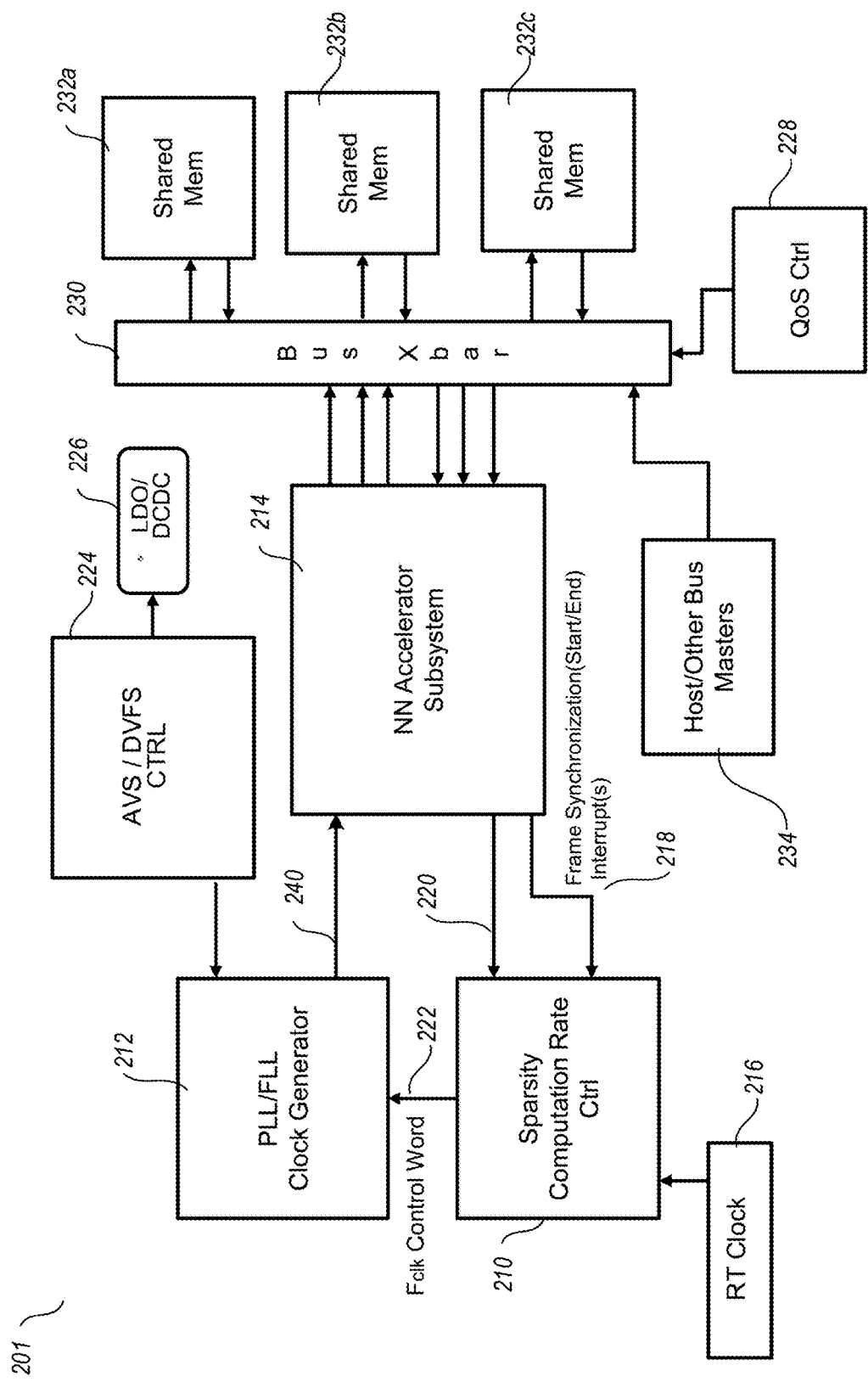
FIG. 2 depicts an exemplary CNN system that includes a sparsity computation rate (SCR) controller in accordance with one or more embodiments of techniques presented herein.

FIG. 2 depicts an exemplary CNN system 201 utilizing a sparsity computation rate (SCR) controller 210 in accordance with an embodiment of techniques presented herein. As noted earlier, while in the depicted embodiment the exemplary CNN system 201 will be discussed herein as intended for use in video frame recognition and/or image frame recognition provided to the CNN system, other embodiments of the described techniques may be utilized for any other purpose suitable for implementation via one or more neural networks.

In the depicted embodiment, the SCR controller 210 is coupled between a PLL/FLL clock generator 212 and a neural network accelerator subsystem 214. The SCR controller 210 is coupled to real time clock 216. In operation, the SCR controller provides closed-loop control of the CNN clock by utilizing inputs to the SCR controller that include indications of a frame execution time, as illustrated frame synchronization start and stop interrupts 218, received from the NN accelerator subsystem 214. These start and stop interrupts provide to the SCR controller an indication of the duration of a frame calculation. Based on this duration, the SCR controller 210 outputs a frequency control word ($F_{clk}$) 222 to the PLL/FLL clock generator. In an embodiment, a down spread frequency value may be generated which results in low output jitter. A nominal frequency of the NN clock output for the PLL/FLL clock generator is determined based on the frequency control word $F_{clk}$.

In various embodiments, the frequency control word $F_{clk}$ 222 may be generated in a variety of ways. As one example, the frequency control word may be generated based on kernel sparsity, such as during an inference pass of the exemplary CNN system 201. In typical configurations, kernel sparsity remains static during execution of the CNN system regardless of the input data. The kernel sparsity may therefore be determined at runtime, such as by processing a static configuration input or by calculating the kernel sparsity dynamically via execution parsing of the neural network for one or more full frames. In certain embodiments, dynamic calculation of the kernel sparsity may thereby provide a downward bias of the frequency control word. As another example, the frequency control word may be calculated based on activation sparsity, which in certain implementations may be a data-dependent and/or weight-dependent metric. In such implementations, the NN accelerator subsystem 214 may generate the frequency control word by passing the activation sparsity metric through, for example, a proportional and integral (P & I) control loop. Parameters of the P & I control loop may be chosen to meet bandwidth and/or damping requirements of the CNN system 201.

In operation of an embodiment, the first time the system is to be executed the CNN system 201 initiates a learning phase. In a first pass of execution, in which only non-zero operations are executed, the CNN system 201 determines a nominal frequency or a frames per second target value, which may generally be an indicator of the nominal sparsity of the kernel. Subsequently, the SCR controller 210 generates the frequency control word 222 based on the nominal frequency or the frames per second target value and feedback indicative of the current frames per second processing of the neural network accelerator subsystem 214. For example, in a particular image to be classified, one or more of the input data values may be zero or below a pruning threshold, and thus result in a processing frame rate which is faster than the target frame rate. In such circumstances, a control word may be generated to decrease the operating frequency of the clock provided to the neural network accelerator subsystem 214.

Frequency control word variation also may arise in processed frames due to quality of service constraints of other shared system resources, such as global and/or external memories. In certain embodiments, the frequency control word may be updated at a rate such that modulation update rates for the frequency control word are less than a bandwidth of the coupled PLL/FLL clock generator 212.

In some embodiments, a nominal frequency or target frames per second rate may be determined periodically, which may facilitate accounting for changes in operational conditions, such as changes due to temperature, fluctuating voltages, aging, etc. In some embodiments, an initial nominal frequency or target frames per second rate may be determined, for example as discussed above, and then adjusted, for example, based on an average of the frame processing rates in operation. The average may be a moving average over a threshold number of frames (e.g., one hundred frames), and filtering may be employed to prevent the average from deviating too far from the initial nominal frequency or frame per second rate. The initial nominal frequency or target frame rate may be a default value, a value determined using a lookup table, etc.

As indicated elsewhere herein, control over the PLL/FLL clock generator 212 based on indications of a frame execution time via the SCR controller 210 may be utilized in conjunction with additional neural network efficiency solutions. In the depicted embodiment, PLL/FLL clock generator 212 is coupled to an AVS/DVFS controller 224, which may provide additional input to the PLL/FLL clock generator such as, for example, scaled operating frequency information for the CNN system 201 based at least in part on an input voltage and a predicted and/or current computational load. Also in the depicted embodiment, the AVS/DVFS controller 224 is coupled to a regulator 226, such as a low dropout regulator (LDO) or DC-DC converter. In certain embodiments, for example in conjunction with high degrees of neural network pruning, the neural network clock signal 240 provided by the clock generator 212 may enable the AVS/DVFS controller, or other controller such as an embedded controller in the neural network accelerator subsystem 214, to select a lower input voltage for the coupled neural network, thereby facilitating improving power and/or operating efficiency.

In certain embodiments, inputs to the SCR controller 210 may include neural network weighting factors 220. For example, in certain embodiments each of interrupts 218 may be associated with a neural network weighting factor. In certain embodiments, the SCR controller 210 may generate or be provided with a target value of desired frames per second, such as via Quality of Service controller 228 and interconnection bus 230. In the depicted embodiment, the interconnection bus 230 is communicatively coupled between the NN accelerator subsystem 214 and shared memories 232a, 232b and 232c, as well as to host 234 (e.g., a host system controlling operation of the NN accelerator subsystem 214 (see host system 404 of FIG. 4)). As another example, in certain embodiments a neural network accelerator subsystem such as NN Accelerator Subsystem 214 may be shared between multiple neural networks (not shown) executing during a single time period (e.g., via time division multiplexing (TDM) or other speculative scheduling schemes). In such embodiments, NN weighting factors 220 may be used by the neural network accelerator subsystem to determine relative processing schedules for execution of those multiple neural networks.

Figure 3:
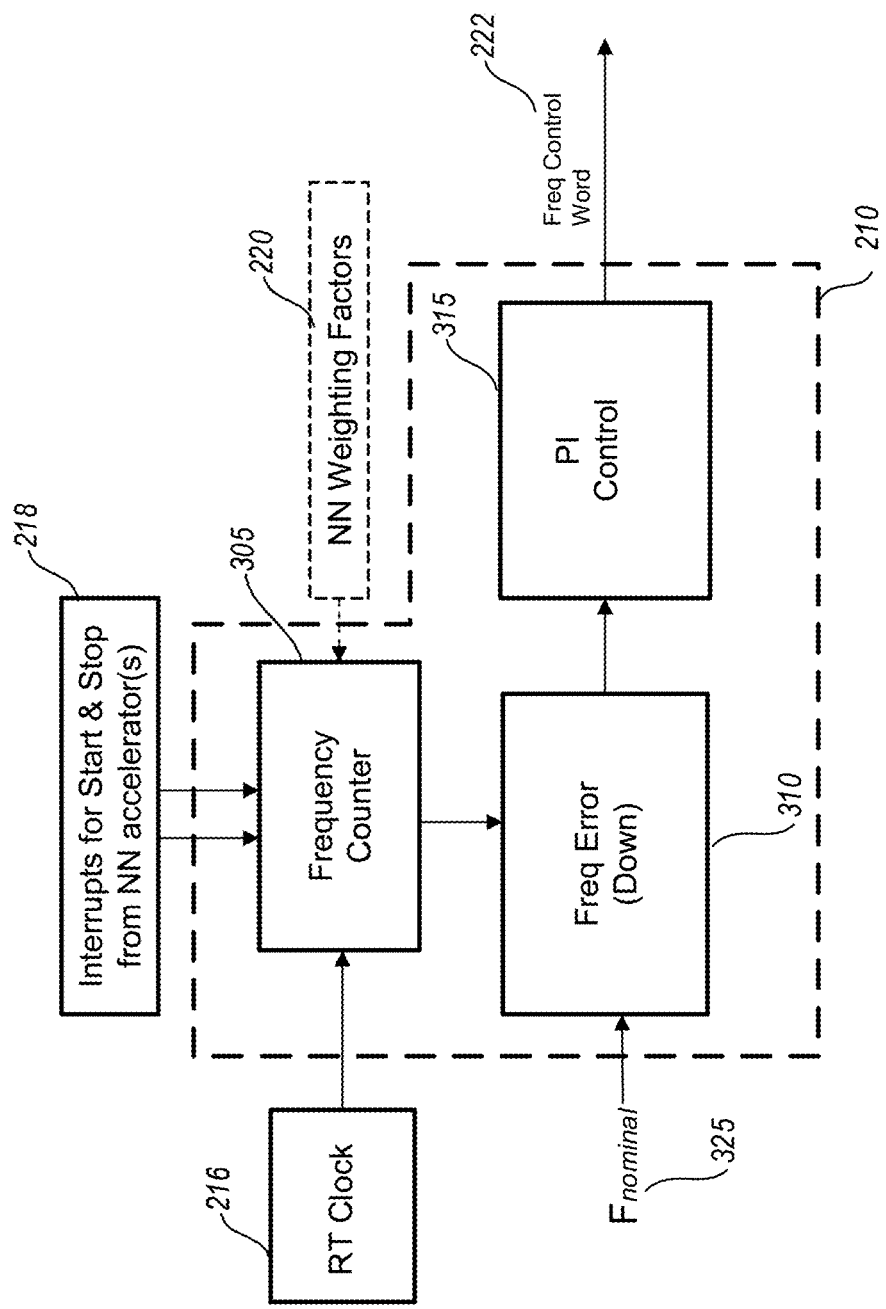
FIG. 3 depicts a sparsity computation rate controller in accordance with one or more embodiments of techniques presented herein.

FIG. 3 depicts an exemplary embodiment of SCR controller 210 from FIG. 2. As depicted, the SCR controller 210 accepts start and stop interrupt information 218 from the NN accelerator subsystem 214 (not shown in FIG. 3 for clarity) in order to produce frequency control word ($F_{clk}$) 222 to control a frequency of a PLL/FLL clock generator, such as clock generator 212 of FIG. 2. The SCR controller 210 is comprised of a frequency counter 305, a frequency error generator 310, and a proportional integral controller 315. In operation, the frequency counter 305 accepts a start frame interrupt signal and a stop frame interrupt signal (and, optionally, neural network weighting factors 220, which may be used in certain embodiments as linear gain scalers) from the NN accelerator subsystem. The frequency error generator 310 determines or retrieves a nominal frequency ($F_{nominal}$) 325 and a frequency output from the frequency counter 305, and determines a difference between the frequency counter output and the nominal frequency $F_{nominal}$ to generate a frequency error. The frequency error is provided to the proportional integral controller 315, which scales and integrates the provided frequency error. An output of the proportional integral controller 315 includes a frequency control word 222, which is input to PLL/FLL clock generator 212 (FIG. 2) to generate a CNN clock signal for the NN accelerator subsystem 214.

Figure 4:
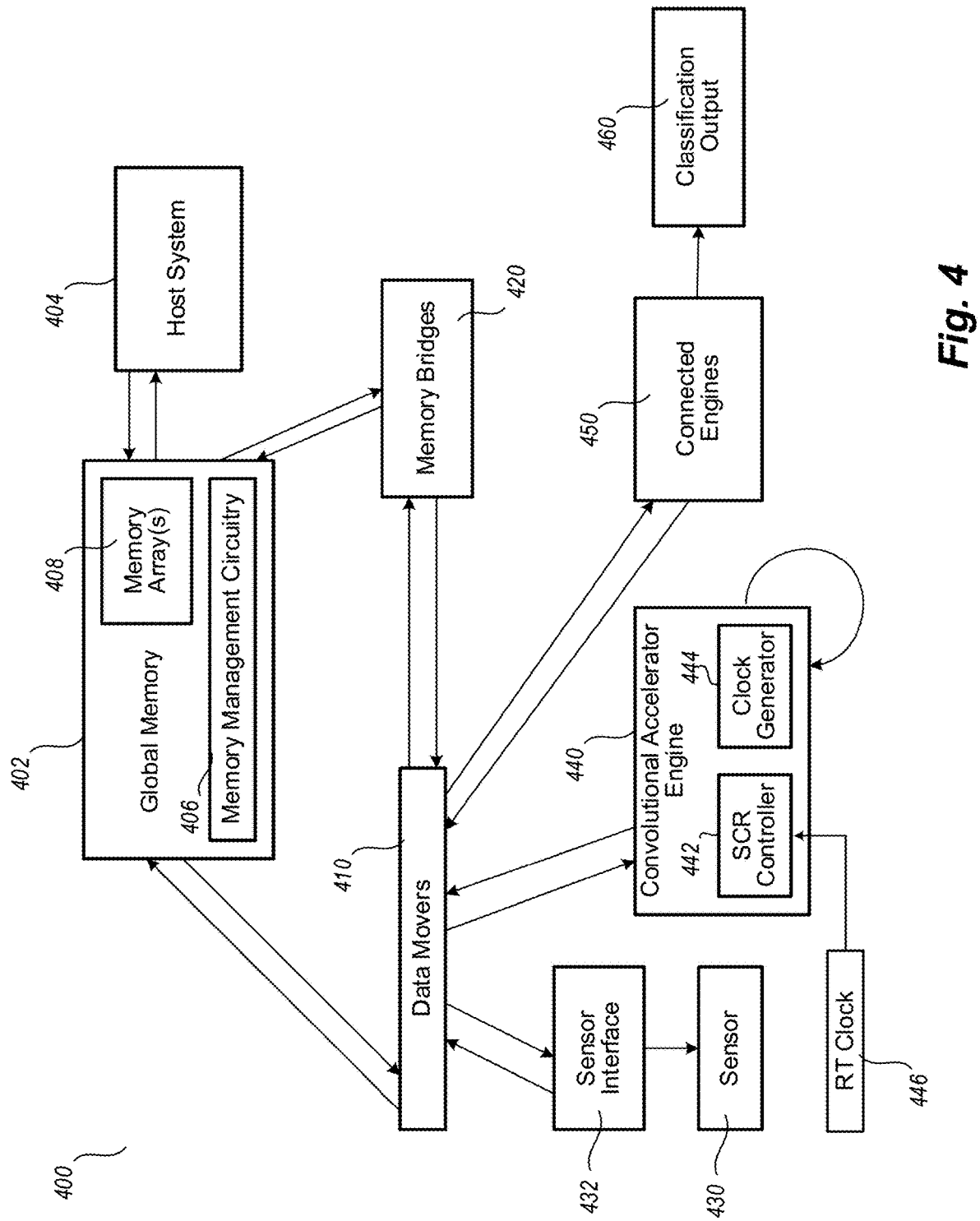
FIG. 4 is a functional block diagram of an embodiment of an electronic device or system utilizing a computationally driven dynamic clock control of an exemplary neural network, in accordance with techniques described herein.

FIG. 4 is a functional block diagram of an exemplary electronic device or system 400 in which various embodiments described herein may be utilized. The system 400 may be used, for example, to implement a convolutional neural network to classify sensor data. It will be appreciated that, as such neural networks may be computationally intensive, the ability to efficiently modify one or more operating frequencies based on information such as data sparsity as needed by the neural network may provide a major improvement with respect to the power management and overall performance of such neural networks. In various implementations, the system 400 may comprise a system on a chip.

The system 400 comprises a global memory 402, which may serve for example as a primary memory, such as for one or more neural network processes or processing clusters, and for one or more host system 404 processes or processing clusters. The global memory 402 comprises memory management circuitry 406 and one or more shared memory arrays 408. The memory management circuitry 406, in operation, employs one or more memory management routines to allocate regions of the shared memory arrays 408 to various processes executed by the system 400.

As illustrated, the system 400 comprises one or more data movers 410, one or more memory bridges 420, one or more sensors 430 and corresponding sensor interfaces 432, one or more convolutional accelerator engines 440, and one or more connected engines 450, which may be implemented and operate to produce a classification output 460.

The data movers 410, in operation, move data streams between IOs (e.g., sensor interfaces 432), memory hierarchies (e.g., global memory 402, memory bridges 420), convolutional accelerator engine 440 and connected engines 450. In the depicted embodiment, the convolutional accelerator engine 440 includes an SCR controller 442 and clock generator 444, with the SCR controller 442 being coupled with a real-time clock 446 in a manner described elsewhere herein with respect to additional embodiments.

In some embodiments, the systems 201, 400, and the controller 210 may include more components than illustrated, may include fewer components than illustrated, may split illustrated components into separate components, may combine illustrated components, etc., and various combinations thereof.

Figure 5:
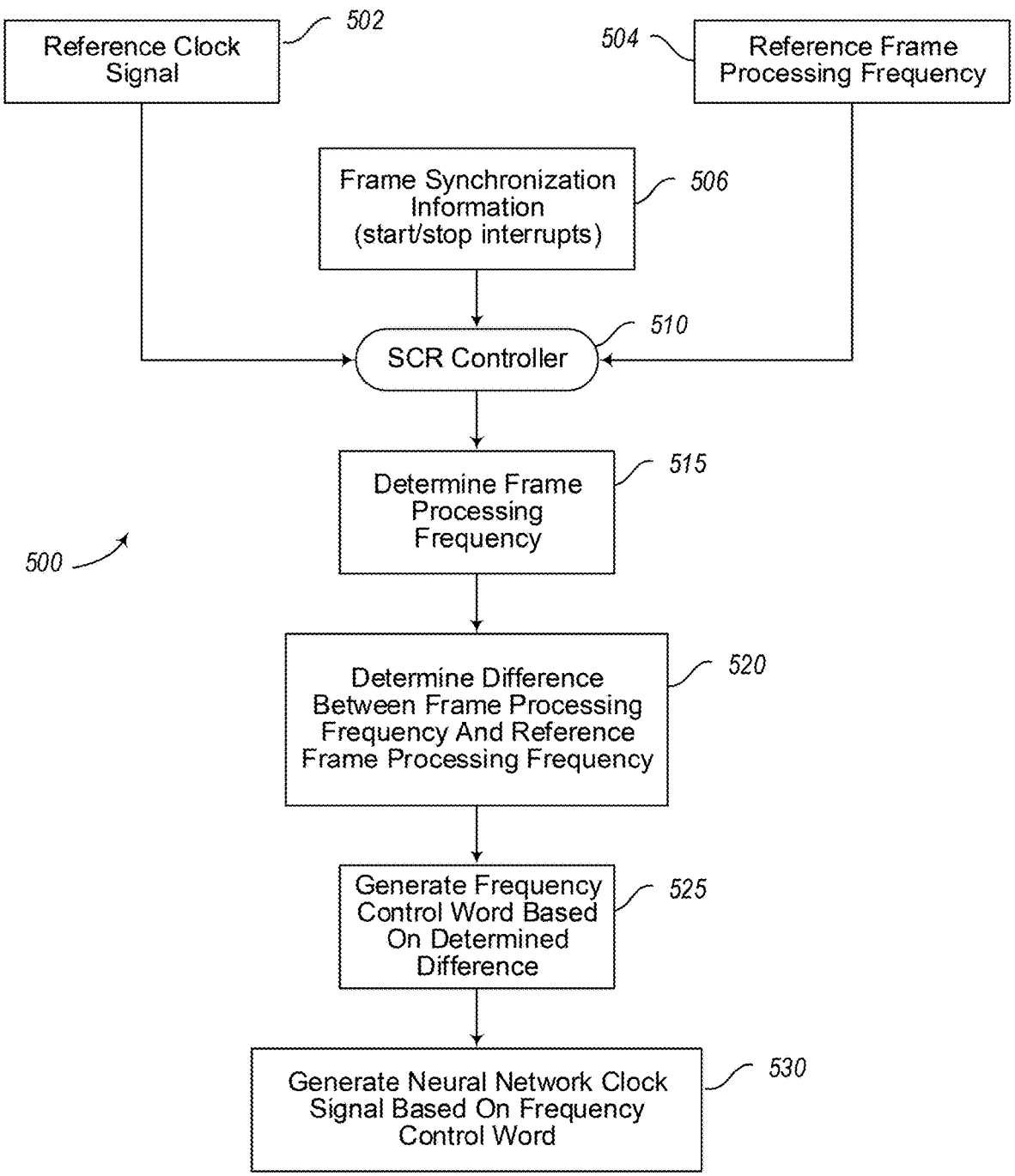
FIG. 5 depicts an exemplary operational routine for a sparsity computation rate controller in accordance with one or more embodiments of techniques described herein.

FIG. 5 depicts an exemplary operational routine 500 for a sparsity computation rate (SCR) controller 510 (features and functionality of which may be substantially similar to those described above with respect to SCR controller 210 of FIGS. 2-3 and/or SCR controller 442 of FIG. 4) in accordance with one or more embodiments of techniques described herein.

The operational routine 500 begins with SCR controller 510 receiving a reference clock signal 502, a reference frame processing frequency 504, and frame duration information, as illustrated frame synchronization information 506.

At 515, the SCR controller 510 determines a frame processing frequency based on the reference clock signal and the frame synchronization information 506, which in the depicted embodiment of FIG. 3 includes start/stop interrupt information, regarding frame data for a processing task of a neural network communicatively coupled to SCR controller 510.

At 520, the SCR controller 510 determines a difference between the determined frame processing frequency and the reference frame processing frequency 504.

At 525, the SCR controller 510 generates a frequency control word (an error signal) based on the determined difference between the determined frame processing frequency and the reference frame processing frequency.

At 530, the SCR controller 510 generates a neural network clock signal based on the frequency control word, such as for use by the communicatively coupled neural network.

Embodiments of methods of controlling a neural network clock may contain additional acts not shown in FIG. 5, may not contain all of the acts shown in FIG. 5, may perform acts shown in FIG. 5 in various orders, and may be modified in various respects. For example, the routine 500 may be modified to generate the reference frame processing frequency.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

In an embodiment, a device comprises: control word generation circuitry, which, in operation, generates a clock frequency control word based on information indicative of a current frame execution rate of a processing task of a neural network and a reference clock signal; and a clock generator coupled to the control word generation circuitry and which, in operation, generates a neural network clock signal for use by the neural network based on the clock frequency control word. In an embodiment, the control word generation circuitry determines the frequency control word based on a reference frequency. In an embodiment, the information indicative of the current frame execution rate comprises frame synchronization information and the control word generation circuitry comprises: a frequency counter which, in operation, determines a current frame processing frequency based at least in part on the reference clock signal and the frame synchronization information; and a proportional integral controller which, in operation, generates the clock frequency control word based on a difference between the determined frame processing frequency and the reference frequency. In an embodiment, the reference frequency is based on a frame processing frequency of an execution of a kernel processing only non-zero operations. In an embodiment, the reference frequency corresponds to a nominal kernel data sparsity associated with the processing task of the neural network. In an embodiment, the reference frequency is based on an average frame execution rate. In an embodiment, the control word generating circuitry comprises a frequency error generator coupled to the frequency counter, which, in operation, determines the difference between the determined frame processing frequency and the reference frequency. In an embodiment, the device comprises an adaptive voltage scaling controller which, in operation, modifies a supply voltage of the neural network. In an embodiment, the adaptive voltage scaling controller modifies the supply voltage based on the neural network clock signal. In an embodiment, the device comprises a dynamic voltage frequency scaling controller which, in operation, generates control information, and the clock generator generates the neural network clock signal based on the control information generated by the dynamic voltage frequency scaling controller. In an embodiment, the information indicative of a current frame execution rate includes a plurality of start interrupt times associated with the processing task and a corresponding plurality of stop interrupt times associated with the processing task. In an embodiment, each of the plurality of start interrupt times corresponds to a starting time associated with processing a respective frame of data and each of the plurality of stop interrupt times corresponds to a stopping time associated with processing the respective frame of data. In an embodiment, each of the plurality of start interrupt times and stop interrupt times is associated with a processing weight, and the control word generation circuitry, in operation, generates the clock frequency control word based on the processing weights. In an embodiment, the information indicative of the current frame execution rate is associated with a current kernel data sparsity of the processing task of the neural network. In an embodiment, the clock generator is one of a group that includes a phase lock loop (PLL) clock generator and a frequency lock loop (FLL) clock generator.

In an embodiment, a system comprises: neural network accelerator circuitry; and closed-loop clock-rate control circuitry coupled to the neural network accelerator circuitry, and which, in operation, generates a clock signal of the neural network accelerator circuitry, the closed-loop clock-rate control circuitry including: control-word generation circuitry, which, in operation, generates a clock frequency control word based on information indicative of a current frame execution rate of a processing task of the neural network accelerator circuitry and a reference clock signal; and a clock generator coupled to the control word generation circuitry and which, in operation, generates the clock signal of neural network accelerator circuitry based on the clock frequency control word. In an embodiment, the control-word generation circuitry, in operation, generates the clock frequency control word based on a reference frequency. In an embodiment, the system comprises an adaptive voltage scaling controller, which, in operation, modifies a supply voltage of the neural network. In an embodiment, the system comprises a dynamic voltage frequency scaling controller, which, in operation, generates dynamic clock control information, wherein the clock generator generates the clock signal of the neural network accelerator circuitry based on the dynamic clock control information.

In an embodiment, a method comprises: executing a kernel using a neural network accelerator; and performing closed-loop clock-rate control of an operating frequency of the neural network accelerator during execution of the kernel, the performing closed-loop clock-rate control including: generating a clock frequency control word based on information indicative of a current frame execution rate of the kernel and a reference clock signal; and generating a clock signal of neural network accelerator circuitry based on the clock frequency control word. In an embodiment, the clock frequency control word is generated based on a reference frequency. In an embodiment, the method comprises modifying a supply voltage of the neural network based on the generated clock signal of the neural network accelerator circuitry. In an embodiment, the method comprises modifying the operating frequency of the neural network using a dynamic voltage frequency scaling controller.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:
1. A device, comprising:
   control word generation circuitry, which, in operation, generates a clock frequency control word based on information indicative of a current frame execution rate of a processing task of a neural network and a reference clock signal; and a clock generator coupled to the control word generation circuitry and which, in operation, generates a neural network clock signal for use by the neural network based on the clock frequency control word.

2. The device of claim 1, wherein the control word generation circuitry, in operation, determines the frequency control word based on a reference frequency.

3. The device of claim 2, wherein the information indicative of the current frame execution rate comprises frame synchronization information and the control word generation circuitry comprises:

a frequency counter which, in operation, determines a current frame processing frequency based at least in part on the reference clock signal and the frame synchronization information; and a proportional integral controller which, in operation, generates the clock frequency control word based on a difference between the determined frame processing frequency and the reference frequency.

4. The device of claim 3, wherein the reference frequency is based on a frame processing frequency of an execution of a kernel processing only non-zero operations.

5. The device of claim 4, wherein the reference frequency corresponds to a nominal kernel data sparsity associated with the processing task of the neural network.

6. The device of claim 2, wherein the reference frequency is based on an average frame execution rate.

7. The device of claim 3, wherein the control word generating circuitry comprises a frequency error generator coupled to the frequency counter, which, in operation, determines the difference between the determined frame processing frequency and the reference frequency.

8. The device of claim 1, comprising an adaptive voltage scaling controller which, in operation, modifies a supply voltage of the neural network.

9. The device of claim 8, wherein, in operation, the adaptive voltage scaling controller modifies the supply voltage based on the neural network clock signal.

10. The device of claim 1, comprising a dynamic voltage frequency scaling controller which, in operation, generates control information, and the clock generator generates the neural network clock signal based on the control information generated by the dynamic voltage frequency scaling controller.

11. The device of claim 1, wherein the information indicative of a current frame execution rate includes a plurality of start interrupt times associated with the processing task and a corresponding plurality of stop interrupt times associated with the processing task.

12. The device of claim 11, wherein each of the plurality of start interrupt times corresponds to a starting time associated with processing a respective frame of data and each of the plurality of stop interrupt times corresponds to a stopping time associated with processing the respective frame of data.

13. The device of claim 12, wherein each of the plurality of start interrupt times and stop interrupt times is associated with a processing weight, and the control word generation circuitry, in operation, generates the clock frequency control word based on the processing weights.

14. The device of claim 1, wherein the information indicative of the current frame execution rate is associated with a current kernel data sparsity of the processing task of the neural network.

15. The device of claim 1, wherein the clock generator is one of a group that includes a phase lock loop (PLL) clock generator and a frequency lock loop (FLL) clock generator.

16. A system, comprising:

neural network accelerator circuitry; and closed-loop clock-rate control circuitry coupled to the neural network accelerator circuitry, and which, in operation, generates a clock signal of the neural network accelerator circuitry, the closed-loop clock-rate control circuitry including:

control-word generation circuitry, which, in operation, generates a clock frequency control word based on information indicative of a current frame execution rate of a processing task of the neural network accelerator circuitry and a reference clock signal; and a clock generator coupled to the control word generation circuitry and which, in operation, generates the clock signal of neural network accelerator circuitry based on the clock frequency control word.

17. The system of claim 16, wherein the control-word generation circuitry, in operation, generates the clock frequency control word based on a reference frequency.

18. The system of claim 16, comprising:

an adaptive voltage scaling controller, which, in operation, modifies a supply voltage of the neural network.

19. The system of claim 16, comprising:

a dynamic voltage frequency scaling controller, which, in operation, generates dynamic clock control information, wherein the clock generator generates the clock signal of the neural network accelerator circuitry based on the dynamic clock control information.

20. A method, comprising:

executing a kernel using a neural network accelerator; and performing closed-loop clock-rate control of an operating frequency of the neural network accelerator during execution of the kernel, the performing closed-loop clock-rate control including:

generating a clock frequency control word based on information indicative of a current frame execution rate of the kernel and a reference clock signal; and generating a clock signal of neural network accelerator circuitry based on the clock frequency control word.

21. The method of claim 20, wherein the clock frequency control word is generated based on a reference frequency.

22. The method of claim 20, comprising:

modifying a supply voltage of the neural network based on the generated clock signal of the neural network accelerator circuitry.

23. The method of claim 20, comprising:

modifying the operating frequency of the neural network using a dynamic voltage frequency scaling controller.

* * * * *